United States Patent

Goldsobel

[15] 3,659,880

[45] May 2, 1972

[54] CONNECTOR FOR FLEXIBLE CONDUIT

[72] Inventor: Norman Goldsobel, 28 Bethal Lane, Commack, N.Y. 11725

[22] Filed: Nov. 5, 1970

[21] Appl. No.: 87,308

Related U.S. Application Data

[63] Continuation of Ser. No. 833,502, June 16, 1969, abandoned, which is a continuation-in-part of Ser. No. 692,467, Dec. 21, 1967, abandoned.

[52] U.S. Cl. .......................... 285/161, 285/243, 285/248, 285/423
[51] Int. Cl. ......................................................... F16l 33/22
[58] Field of Search ................. 285/249, 248, 161, 322, 157, 285/247, 238, 243, DIG. 9, DIG. 20, 258; 174/65 R

[56] References Cited

UNITED STATES PATENTS

| | | | |
|---|---|---|---|
| 713,117 | 11/1902 | Lee | 285/243 |
| 1,036,296 | 8/1912 | McMurtrie | 285/161 |
| 1,532,886 | 4/1925 | Cowles | 285/243 |
| 2,031,825 | 2/1936 | Eastman | 285/243 |
| 2,423,632 | 8/1947 | Ansorge | 285/249 |
| 2,810,594 | 10/1957 | Walsh et al. | 285/243 X |
| 2,876,154 | 3/1959 | Usab | 285/238 X |
| 3,104,120 | 9/1963 | Myers | 285/161 |

FOREIGN PATENTS OR APPLICATIONS 914,094 12/1962 Great Britain .......................... 285/249

*Primary Examiner*—Thomas F. Callaghan
*Attorney*—Howard C. Miskin

[57] ABSTRACT

An electrical connector assembly is provided to connect flexible plastic conduit to an electrical fixture, such as an outlet box. The connector body includes a bottom tubular portion which protrudes through a hole in the fixture, a flange portion, and an upper portion. The upper portion includes a ferrule, an outer tubular extension which is castellated at its top and formed from a flexible elastic plastic resin. A compression nut forces the castellated top portion against the conduit which bulges out between consecutive segments of the castellated portion and locks the connector on the conduit.

10 Claims, 5 Drawing Figures

Patented May 2, 1972  3,659,880
FIG.1
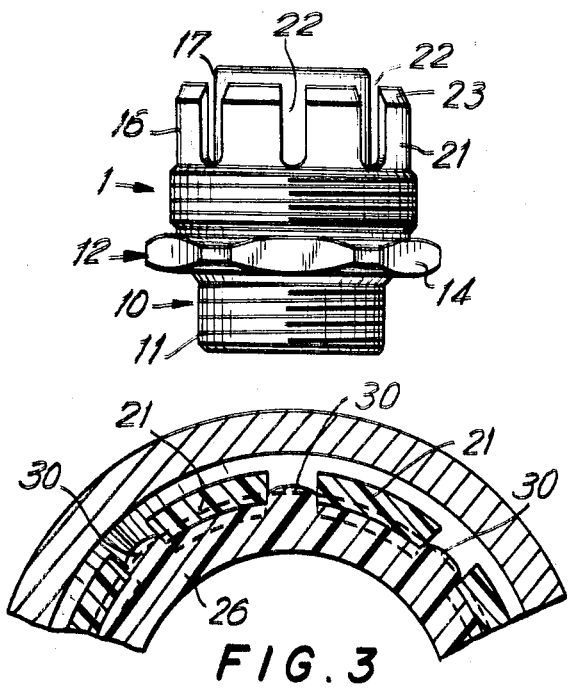
FIG.3
FIG.2
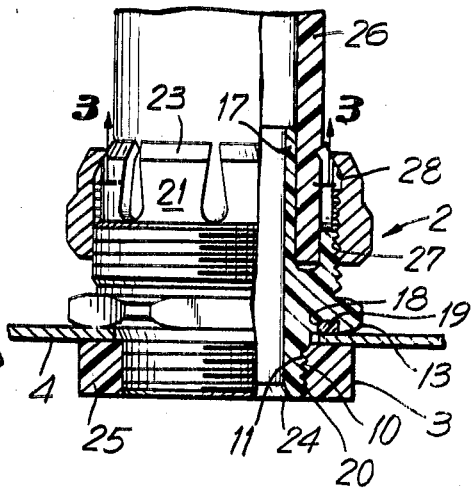
FIG.4
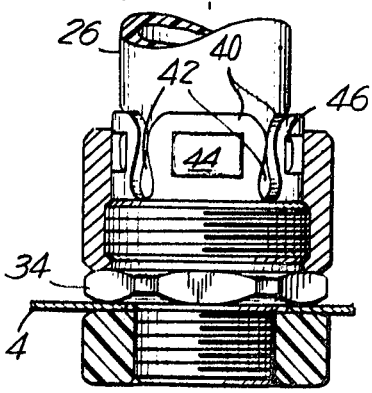
FIG.5
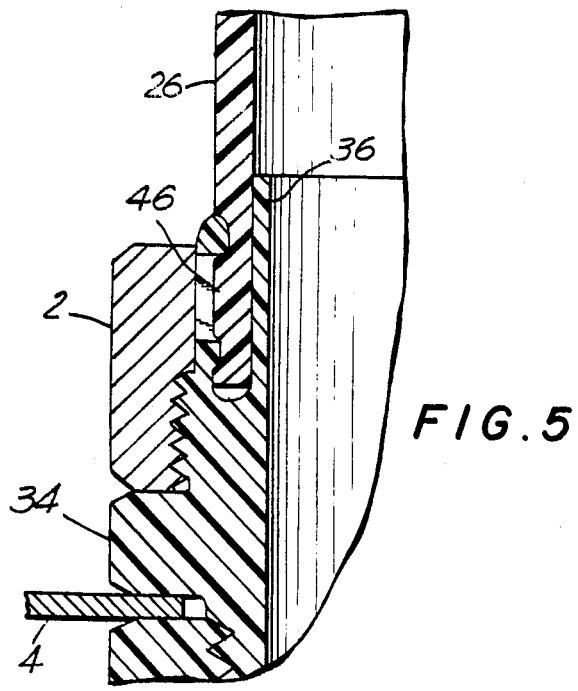
INVENTOR.
NORMAN GOLDSOBEL
BY Howard C. Miskin
ATTORNEY

CONNECTOR FOR FLEXIBLE CONDUIT

This application is a continuation of application Ser. No. 833,502, filed June 16, 1969, and now abandoned; the latter application is a continuation in part of U.S. application Ser. No. 692,467, entitled "Connector for Flexible Conduit," filed Dec. 21, 1967, now abandoned.

BACKGROUND OF THE INVENTION

The present invention relates to electrical connectors and more particularly to liquid-tight connectors which connect electrical fixtures, such as outlet boxes, with flexible conduits.

Flexible conduits are used to protect electric current-carrying wires. The wires are covered by one or more layers of insulating material, such as rubber or a plastic resin. The individual wires may be individually covered by the insulation or covered together to form a unitary cable. The covered wires are snaked or pulled through the conduit and protected by the conduit, which is tubular and has an elongated axial bore. One popular form of conduit consists of interleaved helically wound metal ribbons forming a spiral convolute having an axial core. The winding of the ribbons permits the conduit to be flexed. Such metal conduits have been attempted to be made liquid-tight by covering or impregnating the metal ribbons with a plastic resin or with a rubber composition to form a flexible sheath.

Liquid-tight flexible conduit is used in many places in which the conduit is subject to bending and heavy and rough usage, and oil, chemical or water spray. For example, a flexible conduit may join a portable electric tool to its outlet box. One difficulty experienced with the sheathed metal conduit is that, when crushed, it does not recover. Crushing may occur, for example, when the conduit is run over by a truck or other vehicle. In addition, the sheath may crack or otherwise form openings due to the movement of the metal. Even the smallest opening in the rubber or plastic sheath may provide a leakage path, which may result in the electrical fixture being filled with liquid.

An improved type of conduit has been developed to overcome these difficulties. This improved conduit consists of an inner tubular layer of black plastic, an impregnated woven reinforcement cloth of strong glass fibers or plastic threads around the black plastic tube, and a bright orange or red outer sheath of tough plastic resin covering the cloth. The cloth reinforced conduit carries an extra wire for the ground since it, unlike the metal ribbon conduit, is not itself conductive. The connectors used to connect the metal ribbon conduit have been found not to provide a leakproof and strong connection for the improved cloth reinforced type of conduit.

It is an objective of the present invention to provide a molded connector for reinforced plastic conduit, which connector provides a leakproof seal to the conduit and to an electrical fixture.

It is a further objective of the present invention to provide such a connector which is strong and which quickly locks the conduit against being rotated or pulled out from the connector, including as much as 550 pounds of pulling force.

It is a further objective of the present invention to provide such a connector which may be disconnected from its conduit and re-used, whose pieces may be shipped together, so that they do not become separated before installation, and which is relatively inexpensive.

It is a further objective of the present invention to provide such a connector which has an integral insulative bottom throat to prevent the insulation on the wires from being worn and to prevent, if such wear occurs, the bare wire from coming into electrical connection with the fixture.

In accordance with the present invention, the connector, in its first embodiment, includes a connector body having a bore for the wires of the conduit. Preferably the connector body is injection-molded as a unitary piece from a plastic resin. The connector body has bottom external screw threads which are adapted to fit through an opening in an electrical fixture, such as an outlet box. The connector body has a flange having external flat portions (flats). The bottom surface of the flange carries a liquid sealing means, such as a rubber "O" ring. The flange is adapted to cover the hole in the fixture and to provide a seal with the exterior wall of the fixture. The connector body has second (upper) external screw threads above its flange.

The connector body has a ferrule (an inner tubular extension) which is adapted to fit firmly within the bore of the conduit. An external tubular extension of the connector is adapted to fit around the external wall of the conduit. The conduit fits within an elongated, i.e., deep, groove formed between the ferrule and the outer tubular extensions of the connector body. The outer tubular extension, at its top, is castellated, forming a series of elongated flexible elastic fingers (raised portions or prongs) having spaces between them. Preferably the raised finger portions are beveled at their upper exterior ends. A large compression nut having external flat faces for its turning and an internal screw thread is adapted to fit over the outer tubular extension. The bore at the upper portion of the nut is tapered with a decreasing diameter to form an inwardly slanting tubular face. The compression nut, after the conduit is inserted into the groove of the connector body, is screwed down onto the second (upper) external screw threads of the connector body. The inward tapered face of the compression nut exerts inward deflecting force on the flexible fingers of the outer extension. The fingers bite into the wall of the conduit, deflecting the displaced conduit material into the spaces between adjoining fingers and causing the conduit material in these spaces to bulge outwardly. As the tips of the fingers move radially inwardly, they approach each other thereby tending to encircle the conduit material in these spaces, so that the bulged conduit material locks the conduit against both rotational and longitudinal movement, and forms a seal with the wall of the conduit and the ferrule.

In a second embodiment of the present invention, the castellated portion of the extension has openings in at least some of the fingers to permit the conduit material, displaced when the fingers are forced inwardly, to bulge outwardly through these finger openings.

This conduit material extending beyond the lower peripheral surface of the connector body in these openings and spaces provide greater locking of the conduit on the connector than does mere friction of the fingers on the conduit alone. Since this bulged conduit material is substantially enclosed peripherally by the fingers, it can not be displaced or flow readily, and thus it firmly locks the connector to the conduit both axially and rotationally when the nut is tightened on the connector, but allows the conduit to be readily separated from the connector when the nut is loosened. In a sense, this bulged material acts as an arm on the conduit, which springs radially outwardly through an enclosed opening in the connector during tightening of the nut, and remains in this condition when the nut is tightened to lock the two elements together. This locking action is much greater than caused by friction between the fingers and the conduit. Further, this greater locking action begins almost as soon as the nut is begun to be tightened on the connector.

It is a purpose of the design and an advantage that the conduit and the connector body do not rotate when the compression nut is turned.

Other objectives of the present invention will be apparent from the following description of two embodiments of the invention taken in conjunction with the accompanying drawings, in which:

FIG. 1 is a side view of the first embodiment of the connector of the present invention;

FIG. 2 is a side view of the embodiment of FIG. 1 with the conduit in place and the connector secured in the hole of an outlet box and a portion of the nut broken away with the right side of the figure being a cross sectional view, FIG. 3 is an enlarged fragmentary cross sectional view taken along line 3—3 of FIG. 2;

FIG. 4 is a side view of the second embodiment of the connector of the present invention after the conduit is seated in its groove and the compression nut is fastened down, with a portion of the nut broken away; and FIG. 5 is an enlarged cross sectional view taken along line 5—5 of FIG. 4.

The connector of the first embodiment of the present invention is shown in FIGS. 1, 2 and 3. The connector assembly consists of the connector body 1, a compression nut 2 and a lock (stop) nut 3.

The connector body 1, shown in side view in FIG. 1, is preferably formed as a unitary piece by molding a plastic resin. A suitable plastic resin is one having high dielectric (insulative) and physical strength, such as nylon or nylon filled with short lengths of stable filaments of glass fiber, polypropylene, polyester or other similar plastic material.

The connector body 1 provides a smooth internal insulative bore 5 for the wires of the conduit. The body 1 has a tubular bottom portion 10 having exterior screw threads 11. Screw threads 11 may have a taper, the cone of the threads becoming narrower toward the bottom to provide sealing when screwed into the matching tapered threads of fixtures having threaded holes. A center portion 12 of the connector body 1 forms a flange having a bottom shoulder 13. The center flange portion 12 has a number, preferably six, of flat faces 14 which form surfaces by which a wrench or other tool may grip the connector to turn it or to prevent its turning. A second upper exterior screw thread 15 is formed on the exterior of the upper portion of the connector above the flange portion 12. The screw threads 15 lead into an integral outer tubular extension 16. An inner ferrule (tubular extension) 17 is integral with the upper portion. An annular groove is formed between ferrule 17 and extension 16. The exterior and interior walls of the ferrule are preferably smooth, as is the inside wall of the outer tubular extension 16.

The upper edge of the extension 16 is castellated to form a plurality of flexible elastic fingers 21 having gaps or spaces 22 between them. Preferably the fingers are beveled 23 at the upper outside faces. The bottom of the central flange 12 has a circular annular groove 18, see FIG. 2. A sealing "O" ring 19, for example of rubber, is positioned in the groove 18.

The bottom portion 10 of the connector body 1 fits within a hole in an electrical outlet box 4 or other electrical fixture, such as a panel board. A fastening lock nut 3 is screwed with its internal screw threads 20 onto the threads 11 of the connector body 1. The wall of the box 4 is gripped between the shoulder 13 of the connector body 1 and the top face of the stop nut 3. The "O" ring 19 seals the connector body 1 to the fixture box.

Preferably the inner end of the bottom portion 10 is rounded 24. The fastening lock nut 3 may be made only so long in its axial direction so that its bottom face is level with the end of the bottom portion 10 when the nut 3 is tightened against a box having the standard fixture box thickness. The plastic nut 3 supports (reinforces) the wall of the bottom portion 10. If the wires are pulled against the throat of the bottom portion 10, the nut may prevent the bending or breaking of the throat wall. Alternatively, one or more metal fastening lock nuts may be used in place of the plastic nut 3.

In operation, the bore of the compression nut 2 is placed over the conduit 26. The tubular conduit 26 is positioned within the deep groove formed between extension 16 and ferrule 17. The groove is sufficiently deep so that even if the conduit 26 is cut unevenly, for example, on a bias, it will still be gripped in a liquid-tight seal. The compression nut 2 is then brought down over the outer extension 16.

The compression nut 2 is generally tubular, has external flats for turning, and has internal screw threads 27 at its bottom portion. The compression nut 2 at its upper portion is tapered with a decreasing diameter to form an annular inwardly slanting smooth face 28 at its upper portion. The face 28 forms a continuously narrowing throat for the bore of the nut. The narrowing throat, when the nut is screwed down, exerts inward pressure on the flexible fingers 21. The fingers flex inward and are firmly held against, and bit into, the external wall of the conduit causing the conduit wall to flow or bulge radially outwardly between consecutive fingers 21, as shown best in FIG. 3 at 30. This outward displacement of the resilient conduit wall between the fingers at 30, a distance greater than the inner surface of extension 16, aids in preventing relative rotation of the connector and conduit 26, during threading of the compression nut 2, and retards separation of the conduit from the connector 1. The free ends of the fingers 21 approach each other as they are flexed inwardly to a smaller inner diameter by action of nut 2, as seen best in FIG. 2, leaving a relatively larger separating space between fingers 21 adjacent the upper threaded portion 15 of the connector. The fingers 21 when flexed inwardly by compression nut 2, thus effectively encircle the conduit material bulging outwardly beyond the inner surface of the fingers, which action locks the conduit to the connector body longitudinally and rotationally. For example, a connector may have eight fingers 21, about one-fourth inch wide, one-half inch long and with a space between adjoining fingers of about three-sixteenths inch. When tightened by nut 2, the space between the ends of the fingers is about one-sixteenth inch. This conduit locking action is in addition to the radial clamping action of the fingers by friction.

The wires in the conduit are lead through the connector and connected within the outlet box 4. If, for any reason, the conduit is desired to be removed from the connector, the compression nut 2 is turned off the connector. The fingers 21 are sufficiently elastic and flexible to return upright, the displaced conduit material returns to its unstressed condition, and the connector may be re-used.

In the second embodiment, shown in FIGS. 4 and 5, many of the parts are the same as in the first embodiment and serve the same function. Such similar parts are labeled with the same reference numbers.

In this connector, body 34 has a ferrule 36 and an external tubular extension 38 adapted to fit around the external wall of the conduit 26. The top portion of extension 38 has a series of flexible fingers 40 with spaces 42 between them. At least more than one finger 40 has an opening 44 therein. Fingers 40 are preferably beveled at their external upper edges 46.

In operation, compression nut 2 is brought down over the outer extension 38 and exerts an inward force on fingers 40, which flex inwardly against conduit 26 forcing it against ferrule 36 to form a liquid tight seal. Fingers 40 flexing inwardly displace conduit material, so as to cause this displaced material to flow into openings 44 and expand outwardly, such as at 46. The inward deflection of fingers 40 cause their free ends to approach each other as well. Openings 44 encircle bulged conduit material, locking the conduit to the connector body 34 both rotationally and longitudinally.

It is a purpose of the design that the conduit and the connector body stay together and neither rotates during the time the compression nut 2 is turned and tightened down.

Modifications may be made in the above-described embodiments within the scope of the claims. For example, the unitary plastic connector body of FIGS. 1 and 2 may be molded so that its flange forms a seal with the fixture box without the use of a separate "O" ring. Such a seal may be formed, for example, by a conical tapered shoulder on the bottom of the flange which fits into the hole, forming a conical seat.

The connectors of the present invention may be made with a bore having a straight axis (as shown in the above-described examples). Alternatively, the axis of the bore may be at an angle, for example, 90° or 45°, to provide that the upper section of the connector holding the conduit may be at an angle with respect to the connector's lower section which is within the fixture.

As shown in FIGS. 2 and 4, the inner bore of the compression nut 2 has an inwardly directed portion, which engages the fingers 21 and 40 adjacent their free ends, so as to concentrically and quickly urge the outer ends of the spaced fingers radially inwardly to a greater extent than the inner ends of the fingers abutting the extension, which allows the conduit material displaced by the compressing of the conduit by the inward flexing of the finger ends to flow and bulge outwardly in the space between fingers and in the openings 44 in the fingers, to a height greater than the inner diameter of the connector body. This conduit displacement aids in locking the connector body on the conduit. Thus, when nut 2 is tightened, the conduit material automatically is displaced radially outwardly in the space between the fingers and readily returns to its unstressed condition when the nut is unthreaded. The narrowing of the gap at the ends of the fingers, when the nut is tightened retards longitudinal displacement of the conduit from the connector. Further, the degree of locking is proportional to the force applied. Initially, when nut 2 begins to be tightened the fingers begin to be flexed, and displaced conduit material flows between the fingers to prevent relative rotation of the conduit and connector. As the nut is further tightened, the ends of the fingers draw together and more material flows into the spaces between, and openings in the fingers thereby increasing the locking force both longitudinally and rotationally.

The space between the fingers may vary, but it should be such that the ends of consecutive fingers approach each other, when the nut is in its tightened position.

A ½ inch fitting of the type shown in FIGS. 1–3 made of nylon with only 48 inch-pounds of torque applied to the nut resisted separation of the conduit to 490 pounds with the conduit cut at an 80° angle to the axis of the conduit. When the conduit was cut at 90° to the axis, it resisted a pull out force of 545 pounds. This compares with a tightening torque of 250 inch-pounds being used with steel connectors to satisfactorily attach fittings, and 125 inch-pounds of torque that electricians in the field normally can be expected to apply in the field. This connector did not leak and resisted separation up to 625 PSI hydrostatic pressure applied to the conduit, when the conduit, not the connector, failed. The low installation torque of connectors of the present invention is of importance in use in the field, because of the unlikeliness that connectors will be tightened to the high torque requirements heretofore required to resist high pull-off forces.

The longer the fingers are, the quicker the added locking action occurs. Also, while openings 44 were shown to be generally rectangular, other shaped openings may be used. Also, the number of fingers could be reduced by having the fingers contain openings therein, such as shown in FIG. 4.

What I claim is:

1. An electrical connector assembly for the liquid-tight connection of the cut-off end of a tubular conduit having a slightly resilient outer wall to an electrical fixture having a hole and which automatically prevents rotation and longitudinal displacement of the conduit during assembly without biting into the conduit with teeth, the assembly comprising an integral one-piece connector body of a plastic resin having a continuous bore, said body having a bottom tubular section adapted to fit a hole in the fixture and having first external screw threads and an upper section having at its lower portion second external screw threads and having an inner tubular ferrule directed away from said bottom section, and an outer tubular extension directed away from said bottom section, said ferrule having its external peripheral surface smooth and at a constant diameter, said ferrule and said extension forming between them an annular groove slightly greater than the thickness of said conduit, said extension having at its upper end a plurality of flexible spaced-apart fingers, said fingers having their internal surfaces smooth, continuous and at a constant diameter and externally beveled at the upper ends thereof, said adjoining fingers being spaced apart a distance sufficient to maintain spaced apart relation during assembly and to receive conduit material therebetween displaced by said fingers during assembly, each finger having a solid, circumferentially continuous wall throughout its length and having a substantially constant wall thickness except for said externally beveled upper end; a compression nut having a bore, bottom internal screw threads and an upper section with an internal bore wall, a portion of which extends inwardly, wherein the end of the conduit is positioned in the groove and the compression nut is brought over the fingers and screwed onto the second external threads and the inwardly extending bore wall portion compresses said fingers adjacent their free ends to flex the finger ends radially inwardly into said conduit to grip the conduit and thereby displace resilient conduit material into the space remaining between said fingers adjacent said extension to receive such displaced conduit material and thereby prevent rotation of the conduit while the nut is being screwed onto the connector body and longitudinal displacement of the conduit from the groove, said fingers being of a length to extend axially beyond the upper section of said nut in the assembled position.

2. A connector assembly as in claim 1, wherein the upper ends of said fingers are beveled to cooperate with the nut bore wall.

3. A connector assembly as in claim 1, wherein said body has a central flange having a bottom surface adapted to be positioned on the exterior wall of said fixture, and further including sealing means cooperating with said bottom section for sealing engagement with said fixture.

4. A connector assembly as in claim 1, and also including a lock nut having a bore with internal screw threads, said lock nut being screwed onto said first external threads of said connector body.

5. A connector assembly as in claim 4, wherein said lock nut is of a plastic resin.

6. A connector assembly as in claim 4, wherein said lock nut is of a length axially along its bore such that when tightened against a standard box wall, the lower end of said nut will be substantially flush with the lower end of the said connector body.

7. A connector assembly as in claim 1, wherein the said plastic resin of the said connector body is filled with short stable filaments of glass fibers for reinforcement.

8. A connector assembly as in claim 4, wherein said body has a central flange and the bottom surface of said flange is provided with a sealing means.

9. A connector assembly as in claim 8, wherein said sealing means is an annular groove in said flange into which an elastic gasket is secured.

10. A connector assembly as in claim 9, wherein said gasket is an "O" ring.

* * * * *